United States Patent [19]

Cummins

[11] 4,306,850
[45] Dec. 22, 1981

[54] ROUNDER BARS

[75] Inventor: Donald L. Cummins, Hopewell, Va.

[73] Assignee: AMF Incorporated, White Plains, N.Y.

[21] Appl. No.: 139,327

[22] Filed: Apr. 11, 1980

[51] Int. Cl.³ .............................................. A21C 11/00
[52] U.S. Cl. .................................. 425/332; 425/364 R
[58] Field of Search ............................ 425/332, 364 R

[56] References Cited

U.S. PATENT DOCUMENTS

| Re. 18,545 | 7/1932 | Sternberg | 425/364 |
| 793,155 | 6/1905 | Piper | 425/332 |
| 2,035,188 | 3/1936 | Quick | 425/364 |
| 2,719,495 | 10/1955 | Heuwing | 425/364 |
| 2,858,775 | 1/1958 | Marasso | 425/332 |
| 2,867,000 | 1/1959 | Huszar | 425/332 |
| 3,377,965 | 4/1968 | Atwood | 425/364 |
| 3,448,697 | 6/1969 | Atwood | 425/332 |
| 3,521,578 | 7/1970 | Frailoli | 425/332 |
| 4,008,025 | 2/1977 | Campbell | 425/332 |

*Primary Examiner*—James H. Derrington
*Attorney, Agent, or Firm*—George W. Price; Charles J. Worth

[57] ABSTRACT

A rounder bar with a biased flexible foot portion responsive to surface irregularities of a conveyor for maintaining a continuous contact with the conveyor along the full length of the rounder bar.

6 Claims, 3 Drawing Figures

ROUNDER BARS

This invention relates to dough rounder bars used with conventional dough dividing equipment for converting volumetrically scaled portions of dough into well rounded spherical pieces of equal size for subsequent processing.

Dough dividing or scaling equipment such as shown in U.S. Pat. No. 2,858,775 granted to F. D. Marasso and assigned to the same assignee as in the present application, repeatedly provides a plurality scaled dough portions which are volumetrically equal to each other and to subsequent scaled portions. Partly due to compression and partly from the shearing and cutting action inherent in the scaling process, scaled dough portions tend to lose a good portion of their gas. Accordingly, such a scaled dough portion must be allowed to regain some of the gas that it has lost and to acquire a suitable condition for molding. Therefore, scaled dough portions are immediately rounded to acquire a desired spherical shape and to develop an outer skin which will retain freshly produced gas and simultaneously reduce the stickiness of the dough.

As shown in the aforenoted Marasso patent, the scaling head delivers the scaled portions to an endless belt type conveyor provided with stationary rounder bars along the belt length and angularly offset from the direction of travel of the belt. Each of the rounder bars have a concave face forming a pocket with the belt for shaping the dough as the dough is moved along the bar. It is desirous to maintain a rounder bar in light continuous contact along its full length with the endless belt.

If contact between the rounder bar and the belt is excessive, friction will create undesirable heat and will be destructive to the belt. If, however, there are gaps between a rounder bar and the belt, the dough piece will be subject to a nibbling action resulting in spherical dough portions unequal in size.

An object of the present invention is to provide a rounder bar in continuous contact along its full length with the conveyor belt therebeneath.

Another object of the present invention is to provide the foregoing rounder bar with means for maintaining the contact force within desirable limits.

The foregoing and other objects and advantages of the invention will appear more fully hereinafter from a consideration of the detailed description which follows, taken together with the accompanying drawings wherein a single embodiment of the invention is illustrated by way of example. It is to be expressly understood, however, that the drawings are for illustration purposes only and are not to be construed as defining the limits of the invention.

Figure 1:
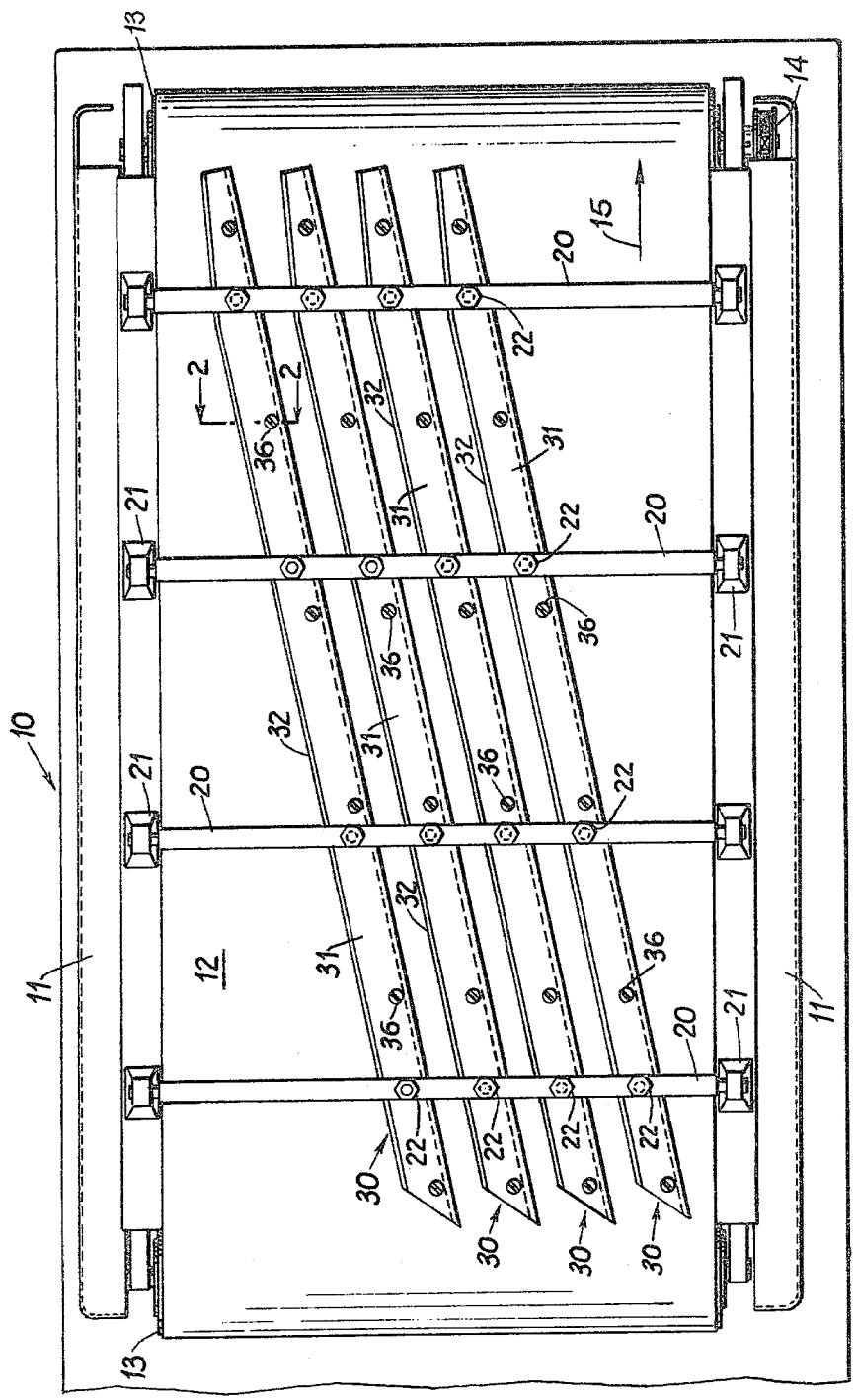
FIG. 1 is a plan view of a belt conveyor and a rounder bar assembly made in accordance with the present invention.

Referring now to the drawings and particularly to FIG. 1, four rounder bars or rounder bar assemblies 30 are suitably connected by fastener means 22 to fixed supports 20 which have their ends mounted in brackets 21 connected to the side frames 11 of the conveyor table 10 of a piece of dough scaling or make-up apparatus. The table 10 is provided with an endless belt type conveyor 12 supported at its ends by rollers 13, one being an idler and the other being driven by means 14 for moving the belt conveyor in the direction of the arrow 15. Although not shown, conventional means such as a plate, is provided between rollers 13 for supporting the conveyor 12.

The rounder bars 30 are disposed along the length of the conveyor 12 and are angularly offset from its direction of travel 15 so that dough pieces on the conveyor being moved along the rounder bars 30 are simultaneously urged into contact with the rounder bar working faces as will be further discussed.

Figure 2:
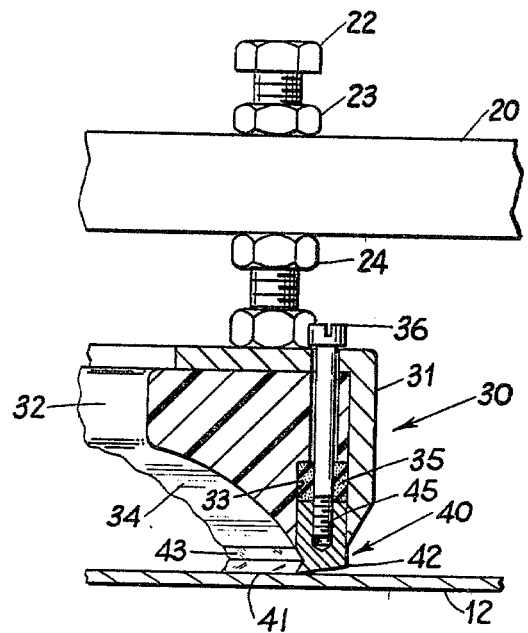
FIG. 2 is an enlarged sectional view taken on line 2—2 of FIG. 1.

A rounder bar 30 made in accordance with the present invention as shown in FIG. 2 preferably is formed of a body member 32 of a high density polyethylene or other suitable material, and a metallic strengthening member 31 abutting the top and back surfaces of the body member. The lower portion of the back surface of the body 32 is recessed, which with the lower portion of the strengthening member 31, defines a slot 33 open at the bottom along the full length of the rounder bar 30. The front surface of the body 32 has a concavity providing the working or shaping face 34 of the rounder bar 30 and with the conveyor 12 defines a pocket in which the dough pieces travel while being processed or rounded.

A blade or flexible member 40 coextensive with the rounder bar 30 is disposed in the slot 33 and extends outwardly therefrom providing an exposed foot portion having a sharp toe or knife edge 41 for contacting the conveyor 12 and a heel 42 which is elevated from the conveyor. The blade 40 also has a small arcuate face 43 which forms an extension of the arcuate face 34. Spring or biasing means 35 in the form of a strip of silicon sponge rubber or another suitable material is disposed in the slot 33 behind the blade 40, urging the blade with a limited force to move downwardly out of the slot 33 toward the conveyor 12.

Figure 3:
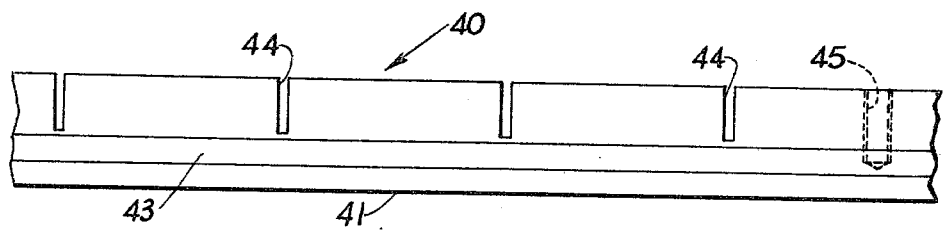
FIG. 3 is an elevational view of a representative length of the flexible blade of the rounder bar of FIG. 2.

A spaced series of fasteners such as bolts 36 which extend through aligned openings or holes in the support member 31, body 32 and spring means 35 threadedly engage threaded holes 45 (see also FIG. 3) in the blade 40 to limit movement of the blade out of the slot 33. The blade 40 is intended to act as a wiper, not a scraper, and the biasing force of the spring means 35 is to merely retain the sharp edge 41 in contact with the conveyor 12 along the full length of the blade. as shown in FIG. 3, to provide the blade 40 with sufficient or desired resiliency to permit localized movement of the sharp edge 41 with surface irregularities of the conveyor 12, a spaced series of slots 44 is provided between each successive pair of threaded openings 45 which receive the ends of the bolts 36.

To appropriately position the rounder bars 30, the fasteners or bolts 22, which extend through openings in the supports 20 and are threadedly connected to the rounder bars, are each provided a pair of jam nuts 23 and 24 one being above and the other below the support 20 through which the bolt 22 extends. Appropriate movement of the jam nuts 23 and 24 will cause the bolts 22 to move axially thereby moving the rounder bars 30 toward and away from the conveyor 12 until each of the rounder bars is in the desired working position. At this time the jam nuts 23 and 24 are moved into a tight engagement with the upper and lower surfaces of the supports 20. Thus, the bolts 22 with jam nuts 23 and 24 which connect the rounder bars 30 to the supports 20 are also position adjusting and locking means.

When the rounder bars 30 are in appropriate working positions, the sharp edges 41 of blades 40 are in contact with the conveyor 12 and the spring means 35 are slightly compressed. This permits localized movements of the blades 40 as the contact edges 41 encounter elevations and depressions in the surface of the conveyor 12.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A rounder bar for use with an endless conveyor of dough make-up equipment, comprising body means having a concave surface forming a working face for cooperation with the conveyor to define a pocket for dough to be formed, said body means having a slot open at the bottom along the full length of said rounder bar, and flexible means coextensive with said rounder bar and being connected to said body means, said flexible means disposed in said slot and extending therefrom forming an exposed foot portion providing a sharp flexible contact edge and being capable of localized movement responsive to irregularities in the surface of the conveyor for maintaining a continuous wiper contact with the conveyor along the full length of said rounder bar.

2. A rounder bar in accordance with claim 1, and said flexible contact edge being adjacent to said working face, and said foot portion having a heel edge held out of contact with the conveyor.

3. A rounder bar in accordance with claim 2, and means disposed in said slot for biasing said flexible means for movement in a direction outwardly from said slot toward the conveyor, and another means for limiting such movement of said flexible means.

4. A rounder bar in accordance with claim 3, and said biasing means being a strip of resilient material coextensive with said flexible means, and said limiting means comprising a spaced series of threaded fasteners each extending freely through aligned openings in said rounder bar and resilient material, and threadedly engaging said flexible means.

5. A rounder bar in accordance with claim 4, and said flexible means having a spaced series of slots between each successive pair of threaded fasteners, each of said slots extending from the surface of said flexible means adjacent said resilient material toward said exposed foot portion to enhance the flexibility of said flexible means.

6. A rounder bar in accordance with claim 5, further comprising means for connecting said rounder bar to a fixed support, said connecting means being operable for moving said rounder bar toward and away from the conveyor to a desired operating position and for releasably locking said rounder bar in such position.

* * * * *